UNITED STATES PATENT OFFICE.

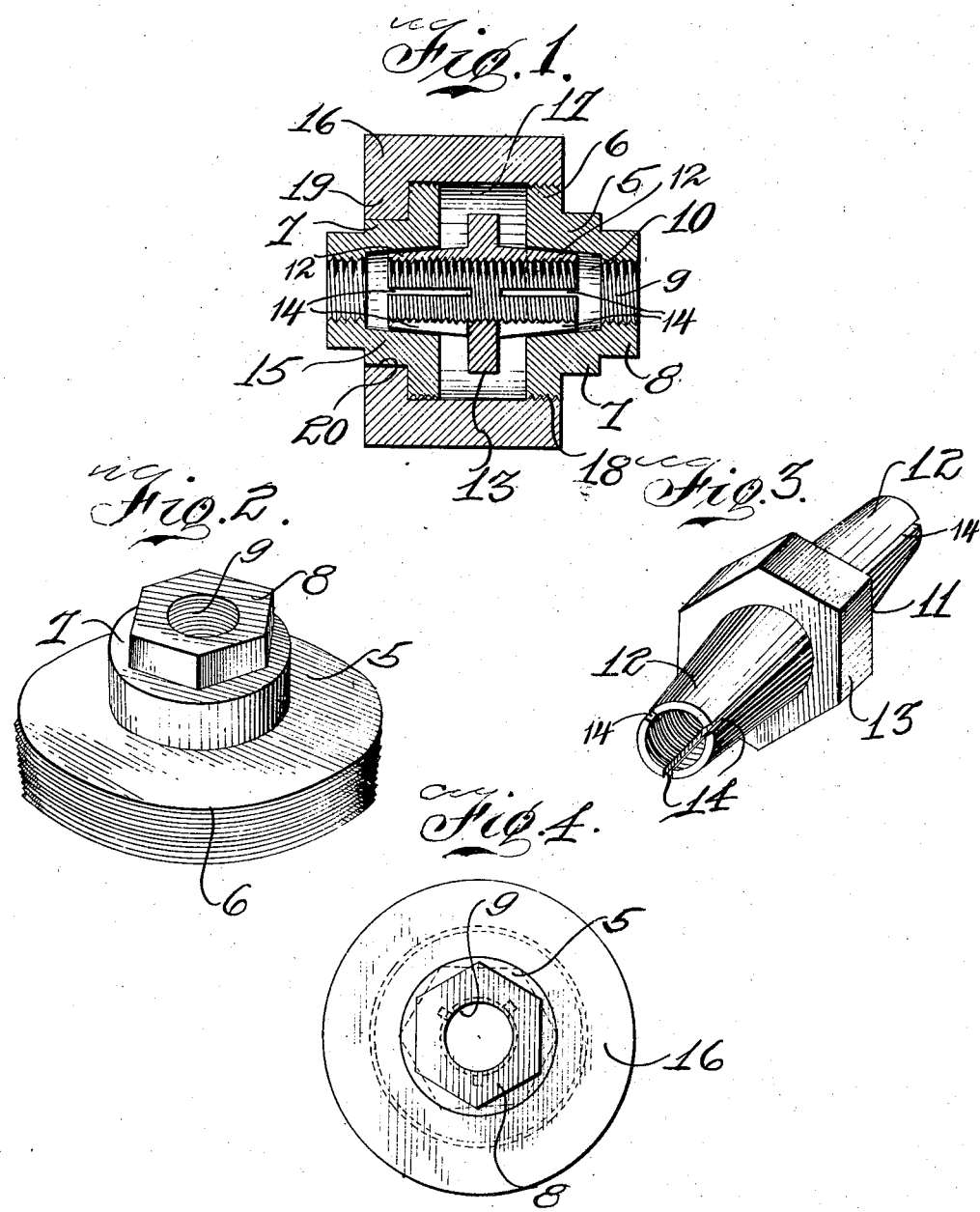

JOSEPH N. G. NESBIT, OF ATLANTA, GEORGIA.

NUT-LOCK.

1,166,538.     Specification of Letters Patent.     Patented Jan. 4, 1916.

Application filed September 11, 1914. Serial No. 861,239.

*To all whom it may concern:*

Be it known that I, JOSEPH N. G. NESBIT, a citizen of the United States, residing at Atlanta, in the county of Fulton and State of Georgia, have invented certain new and useful Improvements in Nut-Locks, of which the following is a specification.

This invention relates to nut locks and more particularly to that class of nut locks in which a cone-shaped member is adapted to be clamped on the threads of the bolt to lock the nut thereon.

An object of the invention is to provide a nut lock, the parts of which are cheap and easy to manufacture and which is efficient in its operation.

The above and other objects are attained by such means as are illustrated in the accompanying drawings, in which—

Figure 1 is a longitudinal sectional view showing the parts in their assembled relation, Fig. 2 is a perspective view of one of the nuts, Fig. 3 is a perspective view of the gripping member, and Fig. 4 is an end elevation.

Referring to the drawings by numerals, 5 designates a nut comprising an annular flange 6, a second flange 7 of smaller diameter than the flange 6, and a polygonal wrench engaging portion 8. An internally screw threaded bore 9 extends throughout a portion of the length of the nut and terminates in a second bore 10, the walls of which diverge toward the inner face of a nut. The flange 6 is screw threaded on its periphery for the purpose to be hereinafter more fully described.

A gripping member 11 having oppositely disposed tapering sleeve-like extensions 12, is adapted to be threaded on the bolt with one of the said extensions thereof in engagement with the tapering opening 10 of the nut 5. Intermediate the extensions 12 the member 11 is enlarged to provide a boss 13 adapted to be engaged by a wrench when it is desired to tighten the member on the bolt. Slots 14 are formed in the extensions 12, the purpose of which will subsequently appear.

A second nut 15, of the same construction as the nut 5, is adapted to be threaded on the bolt with the tapered portion of the bore in engagement with the opposite extensions 12 of the member 11 from that engaged by the nut 5.

As will be apparent upon reference to the drawings, and as stated above the nut 15 is of substantially the same construction as the nut 5, and in accordance therewith the outer face of the flange corresponding to the flange 6 of the other nut, is provided with screw threads.

A member 16, having a bore 17, is internally threaded throughout a portion of its length as indicated at 18, and is arranged to embrace or inclose the nuts 5 and 15. A flange 19 is formed on one end of the member 16 and has an opening 20 therein.

From the above it will be obvious that the member 16 serves to draw the opposite nuts 5 and 15 respectively toward each other upon the extension 12 on the member 11, in order to assure a complete binding action between the latter and the bolt in connection with which the same is being operated.

In assembling the parts above referred to, the nut 5 is first threaded on the bolt to the position where it is desired to be locked, the member 11 next being run up on the bolt until its tapering extension 12 thereof is in frictional engagement with the tapering bore 10 of the nut 5. A wrench is then applied to the boss 13 and the member tightened until the tapering faces of the nut and the member 12 acting against each other force the tongues, formed by the slots of the member 12, into clamping engagement with the bolt. The nut 15 is next threaded on the bolt and is tightened until the tongues of the opposite sides of the member 11 are clamped on the bolt and is mounted similar to the first mentioned tongue. Finally, the member 16 is positioned with the opening 20 over the portion 7 of the nut 15, the threads 18 thereby engaging with the threads formed on the flange 6. By tightening the member 16 it will be readily seen that the parts are locked against accidental removal and under the circumstances cannot jar or work loose.

By reference to the drawings it will be seen that by having both of the nuts 5 and 15 of the same construction, the device is rendered much more efficient in that the nuts may be interchanged should some other or one of the same become unfit for use in the position that it was first placed.

It is desired to have it understood that minor changes in the form and arrangement of the parts of the invention may be resorted to without departing from the spirit, or sacrificing any of the advantages of the invention as claimed.

I claim:—

1. A nut lock comprising a pair of similarly constructed nuts, said nuts being provided with a smooth tapering bore, a gripping member having oppositely disposed smooth external tapering portions, and a member engageable with said nuts to draw the same in binding engagement with said gripping member.

2. A nut lock comprising a gripping member having a threaded bore and oppositely disposed smooth external tapering portions, nuts having a tapering bore for engagement with each of said tapering portions, flanges formed on said nuts, and a member engageable with said flanges to draw the nuts in binding engagement with said gripping member.

3. A nut lock comprising a gripping member having a threaded bore and oppositely disposed smooth external tapering portions, said portions being split longitudinally, a nut having a tapering bore for engagement with each of said tapering portions, flanges formed on said nuts, and a member engageable with said flanges to draw the nuts in binding engagement with said gripping member.

4. A nut lock comprising a gripping member having a threaded bore and oppositely disposed smooth external tapering portions, a nut having a tapering bore for engagement with each of said tapering portions, said nut being further provided with a threaded bore, flanges formed on said nuts, said flanges being threaded upon their peripheral edges, a member engageable with said flanges to draw the nuts in binding engagement with said gripping member, said member being provided with threads whereby the same is engageable with either of said nuts.

In testimony whereof I affix my signature in presence of two witnesses.

JOSEPH N. G. NESBIT.

Witnesses:
SAML. S. WALLACE,
H. D. DAVIS.